(12) United States Patent
Beaupré et al.

(10) Patent No.: US 6,508,894 B1
(45) Date of Patent: Jan. 21, 2003

(54) INSENSITIVE PROPELLANT FORMULATIONS CONTAINING ENERGETIC THERMOPLASTIC ELASTOMERS

(75) Inventors: France Beaupré, St-Augustin (CA); Guy Ampleman, St-Augustin de Desmaures (CA); Charles Nicole, Ancienne Lorette (CA); Jean-Guy Mélançon, St-Etienne-des-Grès (CA)

(73) Assignee: Her Majesty the Queen in right of Canada, as represented by the Minister of National Defence, Ontario (CA)

( * ) Notice: Subject to any disclaimer, the term of this patent is extended or adjusted under 35 U.S.C. 154(b) by 7 days.

(21) Appl. No.: 09/632,970

(22) Filed: Aug. 4, 2000

Related U.S. Application Data

(63) Continuation-in-part of application No. 09/060,305, filed on Apr. 15, 1998, now abandoned.
(60) Provisional application No. 60/053,653, filed on Jul. 24, 1997.

(30) Foreign Application Priority Data

Oct. 22, 1997 (CA) .............................................. 2218935

(51) Int. Cl.$^7$ ........................... C06B 45/10; C08G 63/91
(52) U.S. Cl. .................... 149/19.4; 149/19.5; 149/19.6; 525/410
(58) Field of Search ................................ 149/19.4, 19.5, 149/19.6; 528/44; 525/410

(56) References Cited

U.S. PATENT DOCUMENTS

| | | | | |
|---|---|---|---|---|
| 4,288,262 A | * | 9/1981 | Flanagan et al. | |
| 4,707,540 A | * | 11/1987 | Manser et al. | |
| 4,806,613 A | * | 2/1989 | Wardle | |
| 4,925,503 A | * | 5/1990 | Canterberry et al. | |
| 4,952,644 A | * | 8/1990 | Wardle et al. | |
| 5,223,056 A | * | 6/1993 | Ahad | |
| 5,507,891 A | * | 4/1996 | Zeigler | |
| 5,516,854 A | * | 5/1996 | Wardle et al. | ............... 525/410 |
| 5,540,794 A | * | 7/1996 | Willer et al. | |
| 5,556,935 A | * | 9/1996 | Träubel et al. | |
| 5,587,553 A | * | 12/1996 | Braithwaite et al. | |

FOREIGN PATENT DOCUMENTS

CA  1 160 455  *  1/1984

* cited by examiner

Primary Examiner—Michael J. Carone
Assistant Examiner—Aileen J. Baker
(74) Attorney, Agent, or Firm—Nixon & Vanderhye P.C.

(57) ABSTRACT

An energetic and recyclable propellant composition, which is capable of withstanding cold temperature, includes an energetic copolyurethane thermoplastic elastomer. The propellant composition can be used as a gun or rocket propellant, an explosive or in air bag gas generators.

7 Claims, No Drawings

INSENSITIVE PROPELLANT FORMULATIONS CONTAINING ENERGETIC THERMOPLASTIC ELASTOMERS

This is a continuation in part of U.S. application Ser. No. 09/060,305, filed Apr. 15, 1998, now abandoned and claim the benefit of provisional application No. 60/053,653, filed Jul. 24, 1997.

FIELD OF THE INVENTION

The present invention relates to a propellant composition, and particularly to a propellant composition containing copolyurethane thermoplastic elastomers.

BACKGROUND OF THE INVENTION

In the last decade, there has been a significant interest to develop an improved low vulnerability gun propellant (LOVA) formulation for use in insensitive munitions (IM).

A LOVA gun propellant is one which burns properly when intentionally ignited, but which shows low insensitivity towards unplanned external stimuli such as shock or fire. Although most LOVA formulations of the first generation serve well their purposes, they cannot withstand extreme weather conditions where the propellant is subjected to very low temperature, less than −20° C. In cold weather, the first generation of LOVA formulations as well as the conventional gun propellant formulations loose their mechanical integrity as the gun propellant grains become brittle and crack, which can cause overpressures in the gun barrels leading to breech bursts. Moreover, gun cartridges filled with brittle grains are more sensitive to external stimuli. Hence, they can provoke catastrophic accidents as well as erratic ballistics.

A directive of one embodiment of the present invention is to provide propellant compositions which are capable of exhibiting good mechanical behavior under cold weather.

Propellant compositions commonly include energetic copolyurethane thermoplastic elastomer (TPE). Thermoplastic elastomers typically consist of copolymer chains having monomers A and B distributed throughout the chains as ABA or AB, where the A is the hard segment providing the thermoplastic characteristic and B is the soft segment providing the elastomeric behavior to the polymer. Conventionally, the A segment is formed by a crystalline homopolymer and the soft segment is formed by an amorphous homopolymer.

Thermoplastic elastomers of the type ABA are usually obtained by polymerization the soft B segment followed by the addition of the hard A segment, which is crystallisable. To achieve this type of copolymerization, monomers of both types should have similar reactivity to provide a copolymer of controlled structure with suitable adjustable mechanical properties. A good example of this type of technology is the preparation of 3-azidomethyl-3-methyloxetane and 3.3-bis (azidomethyl)oxetane (AMMO/BAMO) energetic thermoplastic elastomer described in U.S. Pat. No. 4,707,540, issued to Manser et al., Nov. 17, 1987 and U.S. Pat. No. 4,952,644, issued to Wardle et al., Aug. 28, 1990. In this energetic thermoplastic elastomer (ETPE), the thermoplastic part is obtained by the crystallization of the BAMO polymer. Manser et al. also described the use of these AMMO/BAMO energetic homopolymers as prepolymers in making thermoset binders for use in propellants. To obtain the thermoset binders, Manser et al. would typically cure the AMMO/BAMO prepolymers with a triol and diisocyanate to form a chemically cross-linked matrix to obtain the desired binder.

In the case of copolymers of the type AB, the thermoplastic elastomers are usually obtained by mixing monomers that have compatible reactive ending groups. U.S. Pat. No. 4,806,613, to Wardle, Feb. 21, 1989, describes such a method of synthesis. Similarly to Manser et al., Wardle also uses BAMO as the crystalline hard segment. In this, both the A and B homopolymers were end capped with toluene diisocyanate (TDI) leaving at each end an unreacted isocyanate. The homopolymers were mixed and joined by using a small chain extender. Alternatively, Wardle used a block linking technique consisting of reacting the B block with phosgene or a diisocyanate followed by the addition of the A block to form the thermoplastic elastomer. Once again, the crystalline homopolymer BAMO which is an expensive starting material is required to form the hard segment of the thermoplastic elastomer. Moreover, this type of thermoplastic elastomer is not recyclable. Hence the use thereof in a gun propellant would produce a propellant that is expensive to make and non-recyclable. Therefore, there exists a need for a gun propellant that is inexpensive and recyclable.

SUMMARY OF THE INVENTION

One object of one embodiment of the present invention is to provide propellant compositions which are useful in cold weather and which incorporate thermoplastic elastomers having copolymer chains with urethane moieties physically bonded by hydrogen bonds to yield the hard segment of the thermoplastic elastomer.

A further object of one embodiment of the present invention is to provide a propellant composition comprising an energetic copolyurethane thermoplastic elastomer, the thermoplastic elastomer including a hard segment generated by the formation of hydrogen bonds between a first urethane group of one linear copolymer chain with a second urethane group of another linear copolymer chain.

Preferably, the amount of energetic copolyurethane thermoplastic elastomer in the propellant composition of the present invention ranges from about 7 to about 15 weight percent, and most preferably, it is in an amount of about 9 weight percent.

Yet another object of one embodiment of the present invention is to provide a propellant composition comprising:

(a) between 70 and 85 weight percent of an explosive crystal;

(b) between 0 and 6 weight percent of an inert binder;

(c) between 7 and 15 weight percent of an energetic copolyurethane thermoplastic elastomer; the thermoplastic elastomer including a member selected from the group comprising:

(i) a hard segment generated by the formation of hydrogen bonds between a first urethane group of one linear copolymer chain with a second urethane group of another linear copolymer chain;

(ii) a linear copolymer chain comprising an A block and a B block, the copolymer chain having the formula:

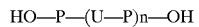

wherein P is selected from the group consisting of

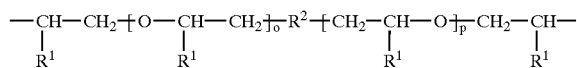

where the $R^1$ groups are the same and selected from the group consisting of —$CH_2N_3$ and —$CH_2ONO_2$;

$R^2$ is selected from the group consisting of —$OCH_2CH_2O$—, —$OCH_2CH_2CH_2O$— and —$OCH_2CH_2CH_2CH_2O$— and o and p are each>1; and

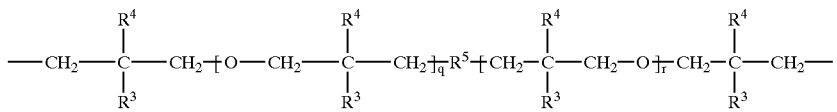

where the R³ groups are the same and selected from the group consisting of —CH₂N₃ and —CH₂ONO₂;
the R⁴ groups are —CH₃;

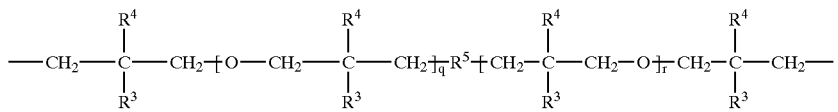

R⁵ selected from the group consisting of —OCH₂CH₂O—, —OCH₂CH₂O— and —OCH₂CH₂CH₂O—; and q and r are both<1;
U is selected from the group consisting of

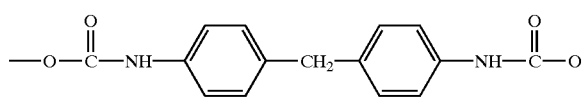

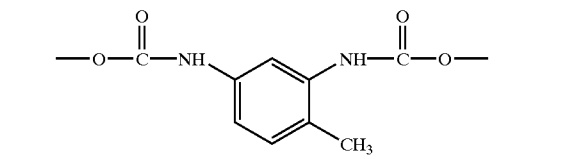
and
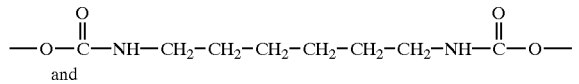

and n is 1 to 100;
wherein the A block is provided by the U moieties and the B block is provided by the P moieties.
(iii) a linear copolymer chain comprising an A block and a B block, the copolymer chain having the formula:

HO—P—(U—(C—U)$_a$—P)$_b$—U—P—OH wherein P is selected from the group consisting of

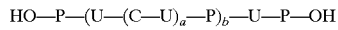

where the R¹ groups are the same and selected from the group consisting of —CH₂N₃ and —CH₂ONO₂;

R² is selected from the group consisting of —OCH₂CH₂O—, —OCH₂CH₂CH₂O— and —OCH₂CH₂CH₂CH₂O—; and o and p are each>1; and

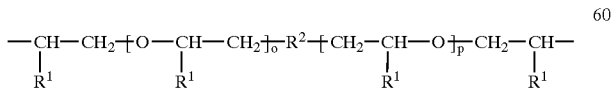

where the R³ groups are the same and selected from the group consisting of —CH₂N₃ and —CH₂ONO₂;
the R⁴ groups are —CH₃;
R⁵ is selected from the group consisting of —OCH₂CH₂O—, —OCH₂CH₂CH₂O— and —OCH₂CH₂CH₂CH₂O—; and q and r are both>1;
U is selected from the group consisting of

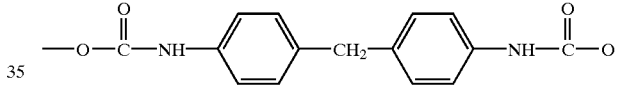

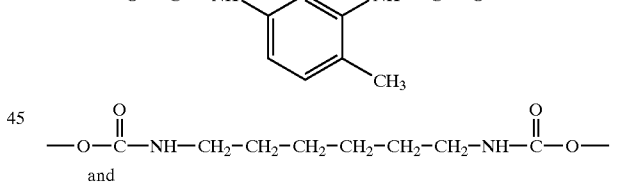

and

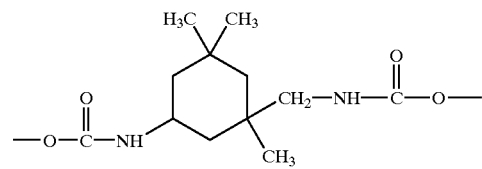

C is selected from the group consisting of

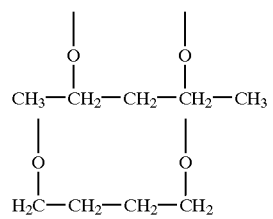

-continued

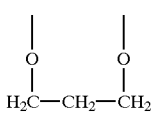

and
—OCH$_2$—(CH$_2$)n—CH$_2$O— where n is 0 to 8;
a is 1 to 100 and b is 1 to 100;
wherein the A block is provided by the U moieties and the B block is provided by the P moieties.

(iv) a linear copolymer chain comprising an A segment and a B segment, the copolymer chain having the formula:

HO—P—U—(C—U)x—(P—U)y—(C—U)z—P—OH wherein P is selected from the group consisting of

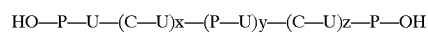

where the R$^1$ groups are the same and selected from the group consisting of —CH$_2$N$_3$ and —CH$_2$ONO$_2$;
R$^2$ is selected from the group consisting of —OCH$_2$CH$_2$O—; —OCH$_2$CH$_2$CH$_2$— and —OCH$_2$CH$_2$CH$_2$CH$_2$O—; and o and p are each >1;

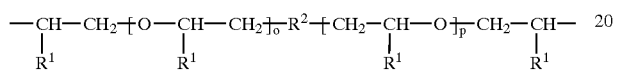

where R$^3$ groups are the same and selected from the group consisting of —CH$_2$N$_3$ and —CH$_2$ONO$_2$;
the groups are —CH$_3$;
R$^5$ is selected from the group consisting of —OCH$_2$CH$_2$O—, —OCH$_2$CH$_2$O— and —OCH$_2$CH$_2$CH$_2$O—; and q and r are both >1;
U is selected from the group consisting of

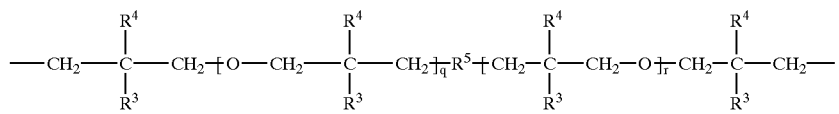

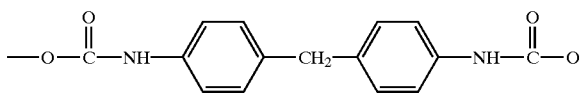

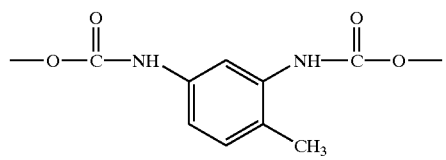

and

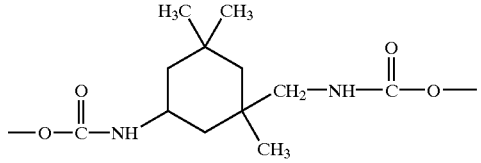

C is selected from the group consisting of

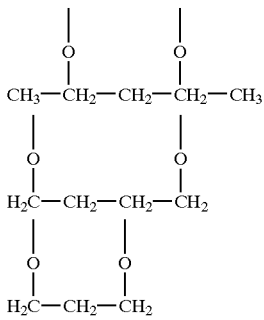

and
—OCH$_2$—(CH$_2$)n—CH$_2$O— where n is 0 to 8;
x, y and z are each an integer from 1 to 100;
wherein the A segment is provided by the U moieties and the B segment is provided by the moieties.

(d) between 4 and 10 weight percent of a plasticizer;
(e) between 0 and 8 weight percent of nitrocellulose; and
(f) between 0 and 1 weight percent of a stabilizer.

The energetic copolyurethane TPE is admixed in a matrix to form the propellant composition of the present invention. The preferred matrix system contains explosive crystals, for example, nitramines such as hexahydro-1,3,5-trinitro-1,3,5-triazine (RDX), in an amount from about 70 to about 85 weight percent and a plasticizer in an amount from about 4 to about 10 weight percent. Suitable plasticizers are energetic plasticizers, for example, nitrate esters such as triethylene glycol dinitrate (TEGDN), 1,1,1-trimethylethane trinitrate (TMETN) or bis-(2,2-dinitropropyl acetal/formal (BDNPA/F), or inert plasticizers.

Additional ingredients which may be included in the formulation are nitrocellulose in an amount of about 0 to about 8 weight percent, an inert binder, for example, cellulose acetate butyrate, in an amount of from about 0 to about 6 weight percent and a stabilizer such as ethyl centralite in an amount of from about 0 to about 1 weight percent.

A still further object of one embodiment of the present invention is to provide a propellant composition, comprising a thermoplastic elastomer, the elastomer comprising a linear copolymer chain comprising an A block and a B block, the copolymer chain having the formula:

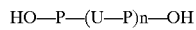

wherein P is selected from the group consisting of

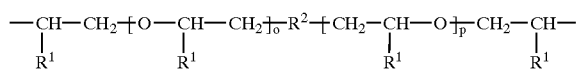

where the R¹ groups are the same and selected from the group consisting of —$CH_2N_3$ and —$CH_2ONO_2$;
R² is selected from the group consisting of —$OCH_2CH_2O$—, —$OCH_2CH_2CH_2O$— and —$OCH_2CH_2CH_2CH_2O$—; and o and p are each>1; and

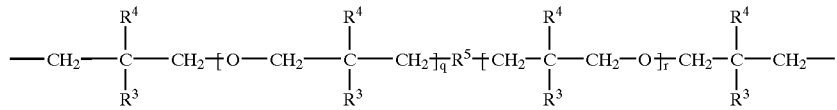

where the R³ groups are the same and selected from the group consisting of —$CH_2N_3$ and —$CH_2ONO_2$;
the R⁴ groups are —$CH_3$;
R⁵ is selected from the group consisting of —$OCH_2CH_2O$—, —$OCH_2CH_2CH_2O$— and —$OCH_2CH_2CH_2CH_2O$—; and q and r are both>1;
U is selected from the group consisting of

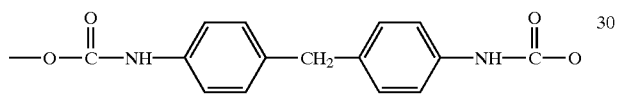

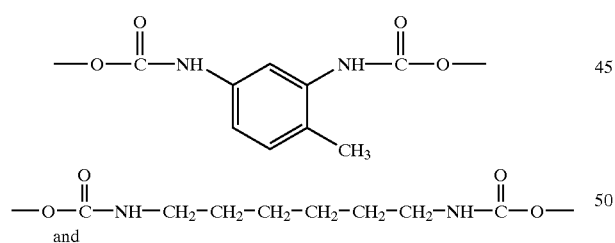

and n is 1 to 100;
wherein the A block is provided by the U moieties and the B block is provided by the P moieties.

In one embodiment of the present invention, the propellant composition includes about 77 weight percent of the explosive crystals, about 2 weight percent of the inert binder, about 9 weight percent of the energetic copolyurethane thermoplastic elastomer, about 7.6 weight percent of the plasticizer, about 4 weight percent of the nitrocellulose and about 0.4 weight percent of the stabilizer.

Another object of one embodiment of the present invention is to provide a propellant composition, comprising a thermoplastic elastomer, the elastomer, comprising a linear copolymer chain comprising an A block and a B block, the copolymer chain having the formula:

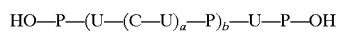

wherein P is selected from the group consisting of

where the R¹ groups are the same and selected from the group consisting of —$CH_2N_3$ and —$CH_2ONO_2$;
R² is selected from the group consisting of —$OCH_2CH_2O$—, —$OCH_2CH_2CH_2O$— and —$OCH_2CH_2CH_2CH_2O$—; and o and p are each>1; and

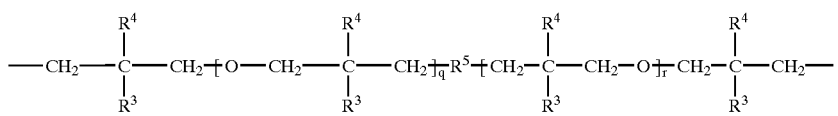

where the R³ groups are the same and selected from the group consisting of —$CH_2N_3$ and —$CH_2ONO_2$;
the R⁴ groups are —$CH_3$;
R⁵ is selected from the group consisting of —$OCH_2CH_2O$—, —$OCH_2CH_2CH_2O$— and —$OCH_2CH_2CH_2CH_2O$—; and q and r are both>1;
U is selected from the group consisting of

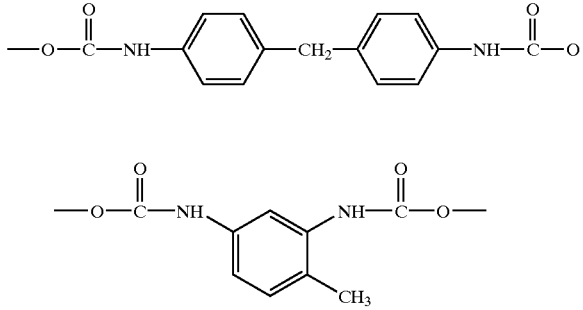

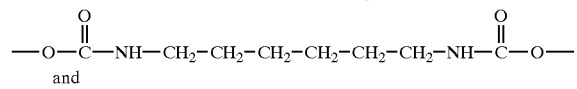

and

-continued

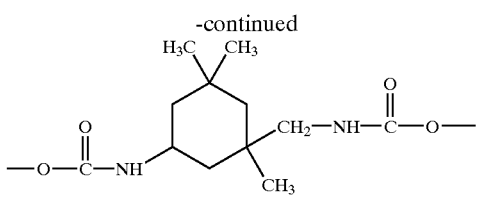

C is selected from the group consisting of

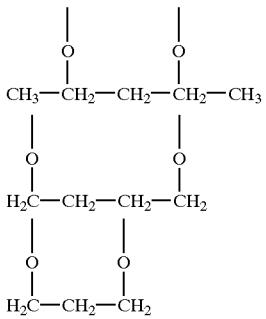

and

—OCH$_2$—(CH$_2$)n—CH$_2$O— where n is 0 to 8;

a is 1 to 100 and b is 1 to 100;

wherein the A block is provided by the U moieties and the B block is provided by the P moieties.

The propellant composition of the present invention is useful as, for example, a gun or rocket propellant, an explosive, a pyrotechnic or can be incorporated in gas generators for air bags in the car industry.

A further object of one embodiment of the present invention is to provide a propellant composition, comprising a thermoplastic elastomer, the elastomer, comprising a linear copolymer chain comprising an A segment and a B segment, the copolymer chain having the formula:

HO—P—U—(C—U)x—(P—U)y—(C—U)z—P—OH wherein P is selected from the group consisting of

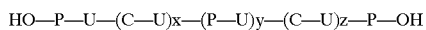

where the R$^1$ groups are the same and selected from the group consisting of —CH$_2$N$_3$ and —CH$_2$ONO$_2$;

R$^2$ is selected from the group consisting of —OCH$_2$CH$_2$O—, —OCH$_2$CH$_2$CH$_2$O— and —OCH$_2$CH$_2$CH$_2$CH$_2$O—; and o and p are each>1; and

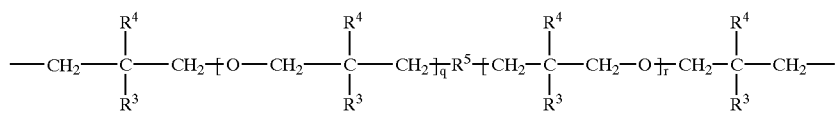

where the R$^3$ groups are the same and selected from the group consisting of —CH$_2$N$_3$ and —CH$_2$ONO$_2$;

the R$^4$ groups are —CH$_3$;

R$^5$ is selected from the group consisting of —OCH$_2$CH$_2$O—, —OCH$_2$CH$_2$CH$_2$O— and —OCH$_2$CH$_2$CH$_2$CH$_2$O—; and q and r are both≧1;

U is selected from the group consisting of

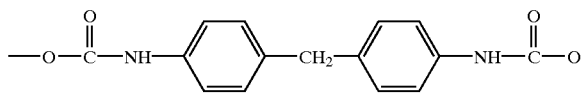

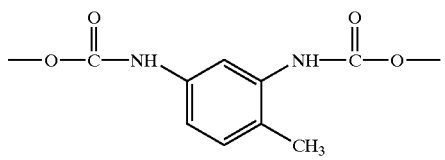

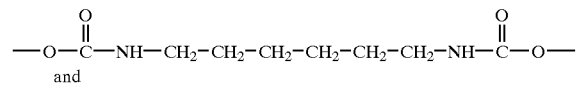

and

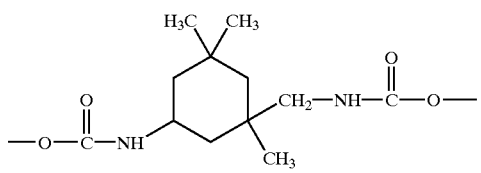

and

C is selected from the group consisting of

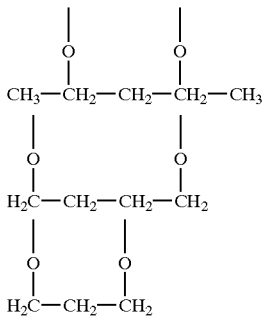

and

—OCH$_2$—(CH$_2$)n—CH$_2$O— where n is 0 to 8;

x, y and z are each an integer from 1 to 100;

wherein the A segment is provided by the U moieties and the B segment is provided by the P moieties.

The advantages of the propellant composition of the present invention are to provide a propellant which can withstand cold temperature, has a high energy content and is recyclable. The propellant composition of the present invention have an energy level above 1200 J/g, which is a noticeable improvement from prior art propellants.

Preface

As used herein, the terms "GAP" means glycidyl azide polymer; "$GAP_{1000}$" means glycidyl azide polymer of molecular weight 1000; "$ETPE-GAP_{1000}$" means an energetic copolyurethane thermoplastic elastomer based on glycidyl azide polymers of molecular weight of 1000; PECH means polyepichlorohydrin; $PECH_{1000}$ means polyepichlorohydrin of molecular weight 1000.

Detailed Description of the Preferred Embodiments

Chemicals

Cellulose acetate butyrate was obtained from Eastman Chemical, USA. TEGDN was obtained from ICI Explosives, USA. Nitrocellulose (grade A, type 2) was obtained from Aqualon Canada. Ethyl centralite, dimethylformamide and 4,4'-methylenebis-phenyl isocyanate were obtained from Aldrich Chemicals Co., Milwaukee, Wis., USA. Ground RDX, which has a grain size of about 0–10 microns, and Class V RDX, which has a grain size of about 0–44 microns, was obtained from DYNO Industries, Norway.

For the preparation of the propellant composition, the nitrocellulose, Class V RDX and ground RDX were used as stored, i.e. with a certain percentage of solvent. In this case, the solvent used was ethanol in an amount of about 18%, 15% and 15% by weight respectively; however, these percentages may vary.

GAP $M_n 2000$ was obtained from 3M company, Minnesota, U.S.A. Dibutyltin dilaurate and 4,4'methylenebis-phenyl isocyanate were obtained from Aldrich Chemical Co., Milwaukee, Wis., U.S.A. Poly-NIMMO $M_n=2000$ was obtained from ICI England.

The propellant composition of the present invention was prepared using a conventional solvent-based process. The preferred processing solvents were ethyl acetate and ethanol.

Initially, the thermoplastic elastomers will be discussed followed by a delineation of the propellant compositions.

The present invention employs energetic thermoplastic elastomers (ETPE) having linear copolymer chains having the formulae:

$$HO-P-(U-P)n-OH \qquad (I)$$

wherein the macromonomers P are derived from energetic dihydroxyl terminated telechelic polymers having a functionality of two or less such as poly glycidyl azide polymer (GAP), poly 3-azidomethyl-3-methyloxetane (AMMO), poly bis 3,3-azidomethyloxetane (BAMO), poly 3-nitratomethyl-3-methyloxetane (NIMMO) and poly glycidyl nitrate (GLYN), with poly GAP being the most preferred compound.

U are components of diisocyanates such as 4,4'methylenebis-phenyl isocyanate (MDI), toluene diisocyanate (TDI), hexamethylene diisocyanate (HMDI) and isophorone diisocyanate (IPDI).

The energetic thermoplastic elastomer of the present invention may further include a chain extender. Suitable chain extenders are:

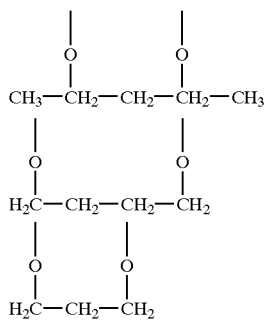

and —$OCH_2$—$(CH_2)n$—$CH_2O$— where n is 0 to 8.

The chain extenders serve a dual purpose. As usual, these chain extenders can be used to increase the molecular weight of the copolymers, but unlike conventional chain extenders, they are also used to increase the hard segment in the energetic thermoplastic elastomer.

The energetic copolymer (I) of the present invention is obtained by polymerizing a dihydroxyl terminated telechelic energetic polymer having a functionality of two or less such as poly glycidyl azide polymer, poly 3-azidomethyl-3-methyloxethane, poly 3-nitratomethyl-3-methyloxetane and poly glycidyl nitrate with a diisocyanate such as 4,4'methylenebis-phenyl isocyanate, toluene diisocyanate, hexamethylene diisocyanate, and isophorone diisocyanate at a NCO/OH ratio ranging from about 0.7 to about 1.2 under dried conditions. The most preferred ratio is about one. The resulting copolymers comprise urethane groups which form hydrogen bonds between the chain of copolymers to yield the hard segment in the copolyurethane thermoplastic elastomer. In contrast to the prior art processes, the process of the present invention is cheap in that an expensive crystalline homopolymer, for example BAMO, is not required.

In a more specific example, the following structure (IV) is obtained by the polymerization of GAP with 4,4'methylenebis-phenyl isocyanate.

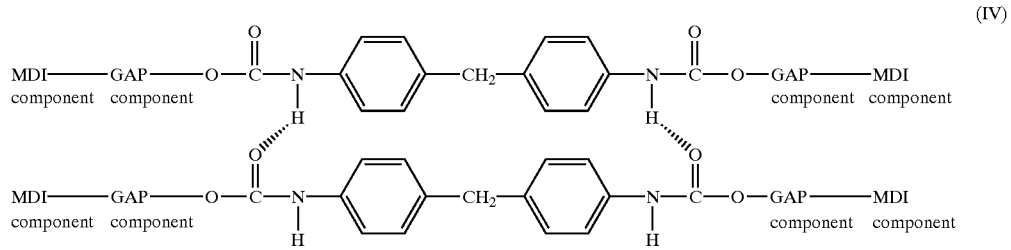

(IV)

In this copolymer, the elastomeric B segment is provided by the amorphous GAP component and the thermoplastic A segment is provided by the urethane moieties of the MDI component. Each urethane group within the copolymer is capable of forming hydrogen bonds with the oxygen of another urethane or with the oxygen of an ether. By doing so, physical cross-links are obtained between the chains. These physical cross-links are reversible and hence, can be broken by melting or dissolving the copolymer in a suitable solvent so that the polymer can be mixed with other components in, for example, a gun propellant formulation. Such a gun propellant can be isolated upon cooling or evaporating the solvent. Cooling or evaporating the solvent lets the broken physical cross-links, i.e. hydrogen bonds, reform to recover the thermoplastic elastomer, thus providing a recyclable product.

In most case, it is also possible to break the hydrogen bonds by melting them. However, in the case of GAP-based copolyurethane thermoplastic elastomers, the copolyurethane should not be melted as both the decomposition of GAP and the melting point of the polyurethanes occur at about 200° C. Generally, linear polyurethanes have melting points in the region of 200° C. when the thermoplastic content is about 20 to 50% by weight. This is when there is enough hard segments to induce crystallinity.

To obtain the best reproducible thermoplastic elastomer, precautions should be applied to avoid cross-linkings or the formation of covalent bonds. The dihydroxyl terminated telechelic energetic prepolymer should have a functionality of two or less. Branched prepolymers or tri or tetra-functional prepolymers would lead to the formation of undesired chemical bonds (crosslinking) which will lead to a thermoset elastomer instead of a thermoplastic elastomer. In reacting the prepolymer with the diisocyanate, the concentration of isocyanate and hydroxyl groups, i.e. NCO/OH ratio, should preferably be kept between about 0.7 to about 1.2, and most preferably about one to yield linear copolyurethane chains. An excess of isocyanate will yield allophanate or biuret group formation, leading to undesirable covalent cross-linkings.

The reaction should also be performed under dried conditions, i.e. avoiding the presence of water. This generally includes drying the dihydroxyl terminated energetic prepolymers before their polymerization and performing the polymerization step under dried conditions.

If present, water will compete with the hydroxyl group of the prepolymers and react with the isocyanate to yield a carbamic acid which decomposes to liberate carbon dioxide and form an amine group. This amine group reacts with isocyanate, yielding an urea group which introduces rigidity and brittleness to the polyurethane. Moreover, this urea group can react with another isocyanate to give a biuret group, thus introducing covalent cross-linking between the copolymer chains. This is mostly important when using prepolymers having secondary hydroxyl group such as GAP and GLYN since water has a reactivity towards isocyanates similar to that of a secondary hydroxyl group. Whereas, the reactivity of primary hydroxyl groups toward isocyanates is ten times the reactivity of water and thus it is less important to avoid the presence of water when using prepolymers containing primary hydroxyl groups such as AMMO, BAMO and NIMMO. The formation of hydrogen bonds are optimal with linear copolyurethanes when the molecular weight is the highest and this is obtained when using a NCO/OH ratio of about one. Such copolyurethanes will provide a good alignment between the copolymers chains which promotes the formation of a high number of hydrogen bonds especially when the diisocyanates are aromatic since the aromatic rings have a great tendency to stacking-up resulting in a perfect alignment of the urethane moieties. The mechanical properties of the copolymers are directly related to the number of hydrogen bonds formed. A high degree of alignment will result in the formation of a high number of hydrogen bonds. This gives a strong hard segment domains and therefore, a strong copolyurethane thermoplastic elastomers. Hence, better quality energetic thermoplastic elastomers are obtained as the NCO/OH approaches one.

A suitable catalyst such as dibutyltin dilaurate can be used to ensure a complete reaction. Preferably, the catalyst is mixed with the prepolymers before the latter is dried to ensure that it is well dispersed in the prepolymer.

Preferably, the diisocyanate is purified prior to its use. This applies mostly to MDI which has a high reactivity towards water and in its presence will form an amino isocyanate or a diamino compound. This compound will introduce chemical cross-linking.

Chain extenders such as ethylene glycol, 1,3-propanediol, 1,4-butanediol and 2,4-pentanediol or other low molecular weight diols may be added to increase the content of hard segments in the thermoplastic elastomer. The addition of chain extenders results in the formation of localized diurethane groups within the copolymer and consequently more hydrogen bonding leading to stronger hard segment domains and stronger copolyurethane thermoplastic elastomers. When using chain extenders, one should increase the amount of diisocyanates in order to keep the NCO/OH at the desired ratio.

The chain extenders can be mixed with the diisocyanate before the addition of the prepolymers or they could be mixed simultaneously with the prepolymers and diisocyanate. In the former case, one would obtain segments consisting of consecutive —U—C— units leading to a linear copolyurethane having the following general formula:

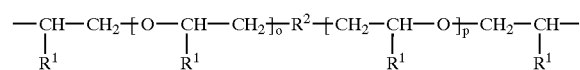

wherein P is selected from the group consisting of

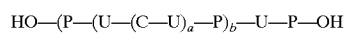

where the $R^1$ groups are the same and selected from the group consisting of —$CH_2N_3$ and —$CH_2ONO_2$;
$R^2$ is selected from the group consisting of —$OCH_2CH_2O$—, —$OCH_2CH_2CH_2O$— and —$OCH_2CH_2CH_2CH_2O$—; and o and p are each>1; and

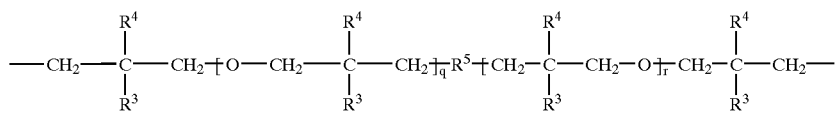

where the $R^3$ groups are the same and selected from the group consisting of —$CH_2N_3$ or —$CH_2ONO_2$ when the $R^4$ groups are —$CH_3$; or $R^3$ and $R^4$ are both —$CH_2N_3$;

$R^5$ is selected from the group consisting of $-OCH_2CH_2O-$, $-OCH_2CH_2CH_2O-$ and $-OCH_2CH_2CH_2CH_2O-$; and q and r are both>1;

U is selected from the group consisting of

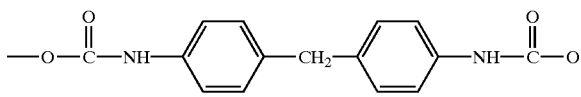

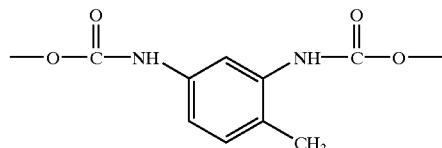

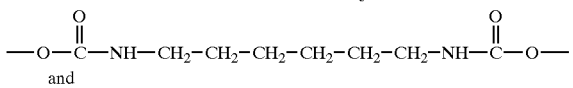

and

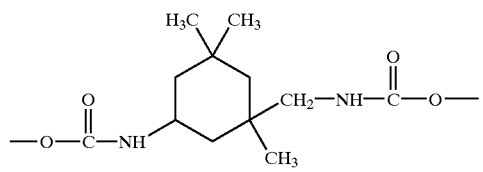

C is selected from the group consisting of

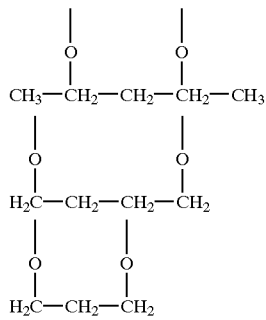

and $-OCH_2-(CH_2)n-CH_2O-$ where n is 0 to 8;

a is 1 to 100 and b is 1 to 100.

This results in very localized hydrogen bonds leading to a hard rubber.

In the latter case, the —C—U— unit is more distributed statistically within the copolymer yielding a copolyurethane having a linear copolyurethane chain having the following formulae:

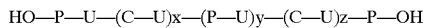

wherein P, U and C are defined as above, and x, y and z are each an integer from 1 to 100.

This will result in a softer rubber than the former case.

Preferably, chain extenders having primary hydroxyl groups are used with energetic prepolymers having primary hydroxyl groups. For example, ethylene glycol would be a good candidate for the polymerization of ETPE based on AMMO or NIMMO prepolymers. Likewise chain extenders having secondary hydroxyl groups such as 2,4-pentanediol is better suited for energetic prepolymers having secondary hydroxyl groups such as GAP and GLYN since the reactivity of the hydroxyl groups are similar.

The properties of the energetic thermoplastic elastomer can also be modified by varying the type of prepolymers used. For example, in applying the process of the present invention to amorphous prepolymers such as GAP, GLYN, AMMO and NIMMO, the resulting product is a rubber having elastomeric properties. However, if the process is applied to a thermoplastic prepolymer such as BAMO, the final product will a hard wax.

The polymerization step in accordance with the method of the present invention may also be performed in a suitable solvent such as ethyl acetate to avoid the solvation step which is necessary if the copolymer is to be used as a component of, for example, a gun propellant obtained using a solvent process.

Having thus generally described the invention, reference will now be made to the examples.

EXAMPLE 1

Preparation of Gap $M_n$=2000 Copolyurethane Thermoplastic Elastomer

1. Determination of the Concentration of OH in Gap $M_n$=2000 by the Equivalent Weight (EW) Method Using NMR Spectroscopy 0.23 g of GAP $M_n$=2000 was reacted with 0.4 mL of acetic anhydride in 5 mL of pyridine at 95° C. in a corked container for 12 hours. The pyridine was evaporated under vacuum (1 to 5 torrs) to give an acetylated polymer and residual pyridine, acetic anhydride and acetic acid. The pyridine, acetic anhydride and acetic acid were removed by dissolution of the acetylated polymer in 30 mL of toluene and co-evaporated under vacuum (1 to 5 torrs). The co-evaporation step was repeated twice and completed with a final evaporation under higher vacuum (0.1 to 1 torr) using a mechanical pump. The resulting acetylated derivative was dissolved in $CDCl_3$ and the $^1H$ NMR spectra was acquired. The equivalent weight determination for GAP was made by integrating the large intensity of the polymer peaks in the region 3.5–4.0 ppm followed by the integration of the acetyl group at 2.1 ppm. The EW was calculated by the following equation:

$$EW \; (g/mol): \frac{I_{GAP}/5 \times MW}{I_{CH3}/3}$$

wherein

EW is equivalent weight (g/mol of alcohol);

$I_{GAP}$ is the area under the GAP peaks in the $^1H$ spectrum (between 3.5 and 4.0 ppm);

$I_{CH3}$ is the area under the $CH_3$ acetyl peak in the $^1H$ spectrum (at 2.1 ppm); and MW is the molecular weight of the monomer repetition unity of GAP (99.1 g/mol).

The EW for GAP $M_n$=2000 was found to be 1200 g/mol.

2. Polymerization 100 g (0.083 mole of OH) of GAP $M_n$=2000 was mixed with 0.05 g of dibutyltin dilaurate (0.05%) to ensure its dispersion in the polymer. The mixture was magnetically stirred in a 500 mL round bottom flask and heated to 60° C. under vacuum for 16 hours to thoroughly dry the prepolymer. The dryness of the prepolymer was evaluated using Karl-fisher analysis. The prepolymer was considered to be dried when there is 0 to 300 ppm of water therein. 10.1042 g (0.0404 mole MDI; 0.081 mole NCO) of freshly distilled 4,4' methylenebis-phenyl isocyanate was added to the hot dried polymer. This gave a NCO/OH ratio of 0.97. The diisocyanate-polymer mixture was thoroughly mixed for one minute and put into a preheated desiccator at 60° C., and a vacuum was applied for about five minutes to remove all gases. The desiccator was then placed in an oven at 60° C. for about 24 hours to complete the polymerization. A GAP-based copolyurethane thermoplastic elastomer having a molecular weight $M_n$ varying from 35,000 to 40,000 was obtained upon cooling, yield 110.15 g.

The spectroscopic analysis of the above product is as follows:

IR: $\upsilon_{max}$(FILM) cm$^{-1}$: 3400, 3320, 2920, 2860, 2100, 1730, 1590, 1520, 1440, 1410, 1340, 1290, 1210, 1100, 930, 910, 850, 810, 660.

$^1$HNMR: d (CDCl$_3$) ppm: 3.1–4.1 (all other protons, m), 5.1 (C$\underline{H}$O—CONH, m), 7.0 (N$\underline{H}$, m), 7.2 (aromatic protons, AB system, $^3J_{AB}$=8.0 Hz $^{13}$CNMR:δ(CDCl$_3$) ppm: 41.2 (phenyl-$\underline{C}$H$_2$), 52.2 (CH$_2$N$_3$), 70.1–72.6 (CH$_2$O) 79.3 (CHO), 119.6 (carbons ortho to NH), 130.0 (carbons meta to NH), 136.2 (carbons para to NH), 137.2 ($\underline{C}$—NH aromatic), 153.0 (urethane carbonyl). IR=infrared, $^1$HNMR=proton nuclear magnetic resonance, $^{13}$CNMR=carbon nuclear magnetic resonance, J=coupling constant in hertz (Hz), m=multiplet, s=singlet.

EXAMPLE 2

Preparation of GAP $M_n$=2000 Copylyurethane Thermosplastic Elastomer in Ethyl Acetate Solvent 100 g of GAP $M_n$=2000 was mixed with 0.05 g of dibutyltin dilaurate (0.05%) and the mixture was magnetically stirred in a 500 mL round bottom flask and heated to 60° C. under vacuum for 16 hours. Dried ethyl acetate was added to the flask in a concentration to obtain 30 to 70% by weight of polymers. 10.1042 g of freshly distilled 4,4' methylenebis-phenyl isocyanate was added to the round bottom flask. The solvated diisocyanate-polymer mixture was stirred at 60° C. for about 24 hours to complete the polymerization. A solvated GAP-based copolyurethane thermoplastic elastomer of molecular weight $M_n$ varying from about 35,000 to 40,000 was obtained upon cooling. The solvated elastomer can be used as is in the preparation of high-energy compositions.

EXAMPLE 3

Preparation of Poly-Nimmo $M_n$=2000 Copylyurethane Thermosplatic Elastomer

1. Determination of the Concentration of OH in Poly-Nimmo $M_n$=2000

The concentration of OH in poly-NIMMO $M_n$=2000 was found to be 1000 g/mole using the equivalent weight method as described in example 1.

2. Polymerization 100 g (0.1 mole of OH) of poly-NIMMO was mixed with 0.05 g of dibutyltin dilaurate to ensure its dispersion in the polymer and the mixture was stirred in a 500 mL bottom flask and heated to 60° C. under vacuum for 16 hours. 10 g (0.04 mole of MDI; 0.08 mole of NCO) of freshly distilled 4,4' methylenebis-phenyl isocyanate was added to the hot dried polymer. This gave a NCO/OH ratio of 0.80. The diisocyanate-NIMMO mixture was thoroughly mixed for one minute and put into a preheated desiccator at 60° C. and a vacuum was applied for about five minutes to remove all gases. The desiccator was then placed in an oven at 60° C. for 24 hours to complete the polymerization. A NIMMO-based copolyurethane thermoplastic elastomer of molecular weight $M_n$ of about 15,000 to 17,000 was obtained upon cooling, yield 110.05 g.

Alternatively, the NIMMO polymer was purified by precipitation in methanol prior to the polymerization step in order to remove trifunctional oligomer impurities present in the commercial poly-NIMMO sample, and the polymerization was performed as described above to yield quantitatively the copolyurethane thermoplastic elastomer of molecular weight of about 15,000 to 17,000. In this case, the NCO/OH ratio was about 0.95.

IR:$\upsilon_{max}$(FILM)cm$^{-1}$: 3400, 3320, 2960, 2930, 2880, 1730, 1630, 1520, 1480, 1450, 1410, 1360, 1280, 1220, 1100, 1060,980, 860,750, 700,630,610.

$^1$HNMR: δ(Acetone-D$_6$) ppm: 1.0 (CH$_3$, s), 3.3 (CH$_2$—O, s), 4.1 (phenyl-CH$_2$, s), 4.5 (CH$_2$ONO$_2$, s), 7.3 (aromatic protons, AB system, $^3J_{AB}$=8.0 Hz), 8.7 (NH-urethane, s).

$^{13}$CNMR:δ(Acetone-D$_6$) ppm: 17.9 (CH$_3$), 41.5 (phenyl-$\underline{C}$H$_2$), 74.6 (CH$_2$O ), 76.5 (CH$_2$ONO$_2$), 119.7 (carbons ortho to NH), 130.3 (carbons meta to NH), 137.3 (carbons para to NH), 138.4 ($\underline{C}$—NH aromatic), 154.8 (urethane carbons).

All the copolyurethanes synthesized according to the process of the present invention are rubber-like material which can easily be dissolved in a solvent such as dried ethyl acetate in a polymer to solvent ratio of about 35:65. The resulting solvated material can be used as an energetic binder in high-energy compositions.

EXAMPLE 4

Emulation of ETPE Based on GAP 1000 Using GAP 2000 and a Chain Extender

The mechanical properties of ETPE based on GAP 1000 which contains 20% of hard segments, may be emulated using commercially available GAP 2000 combined with the chain extender 2,4-pentanediol in order to increase the hard segment from 10 to 20%.

Commercially available GAP 2000 typically has 10% hard segment. This is advantageous since GAP 1000 is not available commercially. Also, usually ETPE are synthesised from prepolymers of fixed molecular weight to give a fixed hard segment content. This can be overcome by using the chain extender and process of the present invention to obtain intermediate hard segment contents such as 14.5%.

Polymerization 372.7813 g (0.3107 mole of OH) of GAP $M_n$=2000 was mixed with 0.1864 g of dibutyltin dilaurate (0.05%) to ensure its dispersion in the polymer. The mixture was magnetically stirred in a 1000 mL round bottom flask and heated to 60° C. under vacuum for 16 hours to thoroughly dry the prepolymer. The dryness of the prepolymer was evaluated using Karl-fisher analysis which indicated 88 ppm of water at the end of the drying period. The prepolymer was considered dried. Freshly distilled 2,4-pentanediol was added to the flask (27.22 g, 0.2614 mole; 0.5227 mole of OH) and the stirring was continued for 30 minutes. 100 g (0.3996 mole MDI; 0.7992 mole NCO) of freshly distilled 4,4' methylenebis-phenyl isocyanate was added to the hot dried mixture of prepolymer and chain extender. This gave a NCO/OH ratio of 0.96. The diisocyanate-polymer-chain extender mixture was thoroughly mixed for one minute and put into a preheated desiccator at 60° C., and a vacuum was applied for about five minutes to remove all gases. The desiccator was then placed in an oven at 60° C. for about 24 hours to complete the polymerization. A GAP-based copolyurethane thermoplastic elastomer having a molecular weight $M_n$ of 25,000 was obtained upon cooling, yielding 500 g of material.

The spectroscopic analysis of the above product is as follows:

IR: $\upsilon_{max}$(FILM) cm$^{-1}$: 3400, 3330, 2930, 2880, 2523, 2105, 1730, 1711, 1599, 1532, 1445, 1415, 1350, 1307, 1283, 1224, 1125, 1020, 937, 856, 818, 769, 669.

$^1$HNMR: d (CDCl$_3$) ppm: 1.29 ( C$\underline{H}_3$—CHO—, s) 3.1–3.9 (all other protons, m), 5.1 (C$\underline{H}$O—CONH, m), 7.0 (N$\underline{H}$, m), 7.2 (aromatic protons, AB system, $^3J_{AB}$ =8.0 Hz)

$^{13}$CNMR: δ(CDCl$_3$) ppm: 19.9 (CH$_3$), 40.0–41.6 (phenyl-$\underline{C}$H$_2$), 50.6 (CH$_2$N$_3$68.0–71.5 (CH$_2$O et CHO—$\underline{C}$H$_2$—CHO), 77.6 (CHO), 118.1 (carbons ortho to NH), 128.3 (carbons meta to NH), 135.8 (carbons para to NH), 136.2 ($\underline{C}$—NH aromatic), 152.0 (urethane carbonyl).

It was observed that the sample was harder compared to an ETPE based on GAP 1000 that has been directly synthesis, i.e. without the use of a chain extender. This is expected since the use of a chain extender will lead to more localized MDI units within the copolymer giving a hard domain more concentrated. In our experience, to synthesize an ETPE with chain extender that has the same molecular properties than the ETPE with GAP 1000, we would synthesize an ETPE at 16% of hard segment. Therefore, a lower content of hard segment is required to achieve the same mechanical properties. This is also advantageous since the copolymer will consists of more GAP and hence be more energetic.

EXAMPLE 5

1. PREPARATION OF ETPE-GAP$_{1000}$ 1.1 PREPARATION OF PECH$_{1000}$

PECH$_{1000}$ was synthesized according to the method as set out in "Cationic Ring-Opening Polymerization of Epichlorohydrin in the Presence of Ethylene Glycol", Okamoto, Y., Polymer Prepar., 25(1), 264, 1984.

1.2 PREPARATION OF GAP$_{1000}$ 400 g of PECH$_{10000}$ was dissolved in 2 L of dimethylformamide (DMF). The solution was added to a 4 L three-neck flask equipped with a reflux condenser and a mechanical stirrer, and was heated at 85° C. 337.34 g of sodium azide was added slowly to the solution and the mixture was heated at 95° C. and stirred for 24 hours. After cooling, the sodium azide mixture was filtered and the DMF was evaporated under vacuum. 1 L of water and 2 L of methylene chloride were added and the mixtures separated. The organic layer was washed three times with 1 L of water, followed by a final washing with 1 L of brine. The organic phase was dried over magnesium sulfate, filtered and evaporated to yield 411.3 g of GAP$_{1000}$ yield 96%. Gel permeation analysis of the product revealed a $M_n$ of 1044 g/mole with a polydispersity of 1.3. The OH equivalent weight was determined by the NMR spectroscopy method and was found to be 530 g/mole.

IR: $\upsilon_{max}$(FILM) cm$^{-1}$: 3400, 2920, 2880, 2100, 1660, 1440, 1340, 1280, 1100, 930, 900, $^1$HNMR: δ(CDCl$_3$) ppm: 3.0 (OH, s), 3.3–4.1 (all other protons, m).

$^{13}$CNMR: δ(CDCl$_3$) ppm: 51.2–53.1 (CH$_2$N$_3$), 68.1–72.4 (CH$_2$O), 78.1 (CHO) IR=infrared, $^1$HNMR=proton nuclear magnetic resonance, $^{13}$CNMR=carbon nuclear magnetic resonance, J=coupling constant in hertz (Hz), m=multiplet, s=singlet.

1.3 PREPARATION OF ETPE-GAP$_{1000}$ 100 g of GAP$_{1000}$ was mixed with 0.05 g of dibutyltin dilaurate in order to ensure its dispersion in the polymer. The mixture was stirred in a 500 mL round bottom flask equipped with a magnetic stirrer and heated to 60° C. under vacuum for 16 hours. 22.6651 g of freshly distilled 4,4'-methylenebis-phenyl isocyanate was added to the hot dried polymer. This gave a NCO/OH ratio of 0.96. The diisocyanate-polymer mixture was thoroughly mixed for one minute and put into a preheated desiccator at 60° C. for 24 hours to complete the polymerization. A copolyurethane thermoplastic elastomer having a molecular weight varying from 27,000 to 30,000 was obtained upon cooling, yield 122.7 g.

IR: $\upsilon_{max}$(FILM) cm$^{-1}$: 3320, 2920, 2870, 2100, 1730, 1590, 1525, 1440, 1410, 1340, 1290, 1210, 1100, 930, 910, 850, 810, 760, 660.

$^1$HNMR: δ(CDCl$_3$) ppm: 3.1–4.1 (all other protons, m), 5.0 (C$\underline{H}$O—CONH, m), 6.9–7.0 (N$\underline{H}$, m), 7.2 (aromatic protons, AB system, $^3J_{AB}$=8.0 Hz).

$^{13}$CNMR: δ(CDCl$_3$) ppm: 41.0 (phenyl, —$\underline{C}$H$_2$), 51.4–52.2 (CH$_2$N$_3$), 69.2–72.5 (CH$_2$O) 79.2 (CHO), 119.5 (carbons ortho to NH), 130.0 (carbons meta to NH), 136.0 (carbons para to NH), 137.1 (C—NH ETPE-GAP$_{1000}$ was solvated in dried ethyl acetate solvent and used, in its solvated form, in the preparation of the following propellant formulation. In this case, the solvent was in a concentration to obtain 40% by weight of polymers.

2. PREPARATION OF THE PROPELLANT COMPOSITION

The propellant was prepared by initially mixing 90 g of ETPE-GAP$_{1000}$ 38 g of TEGDN, 82.75 g of dried ethyl acetate, 4 g of ethyl centralite, 192.5 g of Class V RDX and 577.5 g of ground RDX in a sigma-blade mixer (Baker Perkins) for about 5 minutes at about 50° C. to give a first mixture. The temperature was kept at 50° C. throughout the entire procedure. An additional 38 g of TEGDN and 82.75 g of dried ethyl acetate were added to the first mixture, and the combined material were mixed for 10 minutes to give a second mixture. To the second mixture was added 40 g of nitrocellulose and 20 g of cellulose acetate butyrate, and the combined material were mixed for about 45 minutes until a dough-like homogeneous mixture was obtained. Once the dough-like mixture was obtained, the solvent was evaporated until an amount of about 10–20% by weight was left in the mixture. The dough was extruded to obtain extruded strands of desired geometry, which were then cut into grains. The grains were air dried at room temperature for about 24 hours, following which, they were put into an oven at 60° C. for five days to dry.

While the foregoing embodiments of the present invention have been described and shown, it is understood that all alternatives and modifications may be made thereto and fall within the scope of the invention.

We claim:

1. A propellant composition comprising an energetic copolyurethane thermoplastic elastomer, said thermoplastic elastomer including a hard segment generated by formation of hydrogen bonds between a first urethane group of one linear copoloymer chain with a second urethane group of another linear copolymer chain, wherein said second urethane group are selected from the group consisting of

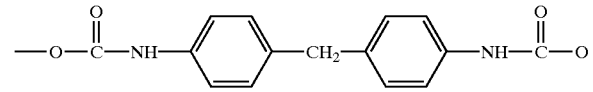

-continued

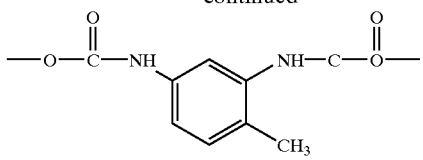

and

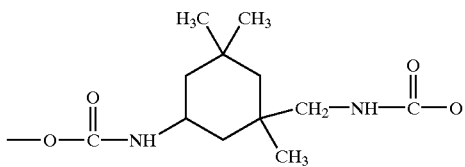

and the energetic thermoplastic elastomer further comprises a soft segment generated by a macromonomer derived from a prepolymer selected from the group consisting of glycidyl azide polymer, poly-3-azidomethyl-3-methyloxetane, poly-3-nitratomethyl-3-methyloxetane, and poly-glycidyl nitrate and said composition further comprises from between 70 and 85 weight percent of explosive nitramine crystals.

2. The propellant composition of claim 1, wherein said energetic copolyurethane thermoplastic elastomer ranges in an amount of from between 7 and 15 weight percent.

3. The propellant composition of claim 2, wherein said energetic copolyurethane thermoplastic elastomer is in an amount of about 9 weight percent.

4. The propellant composition of claim 1, wherein said prepolymer is glycidyl azide polymer.

5. The propellant composition of claim 1, wherein said prepolymer has a molecular weight ranging from between 500 and 10,000.

6. The propellant composition of claim 1, further comprising from between 4 and 10 weight percent of a plasticizer.

7. The propellant composition of claim 6, wherein said plasticizer is a nitrate ester.

* * * * *

UNITED STATES PATENT AND TRADEMARK OFFICE
CERTIFICATE OF CORRECTION

PATENT NO. : 6,508,894 B1
DATED : January 21, 2003
INVENTOR(S) : Beaupre et al.

It is certified that error appears in the above-identified patent and that said Letters Patent is hereby corrected as shown below:

Column 2,
Line 67, ">1" should be -- $\geq$ --;

Column 3,
Line 22, "-OCH2Ch2O-" at its second occurrence should be -- -OCH2CH2CH2O- --;
Line 23, "-OCH2CH2CH2O-" should be -- -OCH2CH2CH2O- --; and
Line 23, "<1" should be -- $\geq 1$ --.

Column 4,
Line 12 ">1" should be -- $\geq 1$ --; and
Line 29, ">1" should be -- $\geq 1$ --.

Column 5,
Line 28, "-OCH2CH2CH2-" should be -- -OCH2CH2CH2CH2O- --;
Line 30, ">1"should be -- $\geq 1$ --;
Line 43, "the groups" should be -- the R4 groups --;
Line 45, "-OCH2CH2O-" at its second occurrence should be
-- OCH2CH2CH2O- --;
Line 46, "-OCH2CH2CH2O-" should be -- -OCH2CH2CH2CH2O- --; and
Line 46, >1" should be -- $\geq 1$ --

Column 7,
Line 11, ">1" should be -- $\geq 1$ --; and
Line 26, ">1" should be -- $\geq 1$ --.

Column 8,
Line 32, ">1" should be -- $\geq 1$ --; and
Line 48, ">1" should be -- $\geq 1$ --.

Column 9,
Line 53, ">1" should be -- $\geq 1$ --.

UNITED STATES PATENT AND TRADEMARK OFFICE
CERTIFICATE OF CORRECTION

PATENT NO.   : 6,508,894 B1
DATED        : January 21, 2003
INVENTOR(S)  : Beaupre et al.

It is certified that error appears in the above-identified patent and that said Letters Patent is hereby corrected as shown below:

Column 11,
Line 27, "Mn2000" should be -- Mn=2000 --.

Column 14,
Line 54, ">1" should be -- $\geq$ --.

Column 15,
Line 3, ">1" should be -- $\geq 1$ --.

Column 20,
Line 21, "(C-NH" should be -- (C-NH aromatic), 153.0 (urethane carbonyl) --.

Signed and Sealed this

Fifteenth Day of July, 2003

JAMES E. ROGAN
*Director of the United States Patent and Trademark Office*